(12) United States Patent
Minoshima

(10) Patent No.: US 8,245,121 B2
(45) Date of Patent: Aug. 14, 2012

(54) SIGNAL CONTROL CIRCUIT AND SIGNAL CONTROL APPARATUS

(75) Inventor: Hiroyuki Minoshima, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1113 days.

(21) Appl. No.: 11/905,891

(22) Filed: Oct. 5, 2007

(65) Prior Publication Data

US 2008/0163037 A1 Jul. 3, 2008

(30) Foreign Application Priority Data

Dec. 28, 2006 (JP) .................................. 2006-354396

(51) Int. Cl.
*G06F 11/00* (2006.01)

(52) U.S. Cl. ........................................................ 714/819

(58) Field of Classification Search .................. 714/819, 714/820, 822

See application file for complete search history.

(56) References Cited

U.S. PATENT DOCUMENTS

| 5,931,927 | A * | 8/1999 | Takashima | 710/65 |
| 6,389,522 | B1 * | 5/2002 | Usami | 711/167 |
| 6,708,277 | B1 * | 3/2004 | Morris et al. | 713/300 |
| 7,280,412 | B2 * | 10/2007 | Jang et al. | 365/189.07 |
| 7,369,449 | B2 * | 5/2008 | Tsunetou | 365/189.07 |
| 7,411,840 | B2 * | 8/2008 | Gaskins et al. | 365/189.07 |

FOREIGN PATENT DOCUMENTS

| JP | 07-084985 A | 3/1995 |
| JP | 11-167530 A | 6/1999 |
| JP | 2002-300021 A | 10/2002 |
| JP | 2004-318450 A | 11/2004 |

OTHER PUBLICATIONS

Japanese Office Action mailed Oct. 25, 2011 for corresponding Japanese Application No. 2006354396, with partial English-language translation.

* cited by examiner

*Primary Examiner* — Stephen Baker
(74) *Attorney, Agent, or Firm* — Fujitsu Patent Center

(57) ABSTRACT

A signal control circuit and a signal control apparatus that can reduce processing time and can send or receive correct data with reliability. When a data generation block outputs data, a data judgment block judges the number of changed bits by comparing each bit of the data output in the preceding session with the corresponding bit of the data to be sent in the current session and outputs position information indicating the position of each changed bit and the number of changed bits when the number of changed bits has reached a predetermined level. An output control block keeps a time period for stabilizing the change in value of the bit corresponding to the position information when the data is output, and directs a data storage block to send the value of the bit corresponding to the position information to an external circuit after the kept period has passed.

8 Claims, 14 Drawing Sheets

SIGNAL CONTROL CIRCUIT AND SIGNAL CONTROL APPARATUS

CROSS-REFERENCE TO RELATED APPLICATIONS

This application is based upon and claims the benefits of priority from the prior Japanese Patent Application No. 2006-354396 filed Dec. 28, 2006, the entire contents of which are incorporated herein by reference.

BACKGROUND OF THE INVENTION

1. Field of the Invention

The present invention relates to signal control circuits and signal control apparatuses, and particularly to a signal control circuit having an external output terminal for a plurality of bits and a signal control apparatus for inputting and outputting data of a plurality of bits inside the apparatus.

2. Description of the Related Art

In general signal control circuits included in large-scale-integration (LSI) chips, noise resulting from a concurrent change in a plurality of bits of an output signal (for example, an output signal of eight bits is changed from "00000000" to "11111111") output from the signal control circuit may cause one or more bits of the output signal to indicate a wrong value temporarily, which could lead to a malfunction. This type of malfunction can be avoided by reducing the absolute amount of noise through strengthening the power system or lowering the input or output speed. However, strengthening a power source and related circuits is costly, and lowering the input or output speed lowers the performance.

Some known methods monitor whether a concurrent change occurs and take measures against noise when a predetermined number of changes is exceeded (refer to Japanese Unexamined Patent Application Publication Nos. Hei-11-167530, 2004-318450, and Hei-7-84985). The method disclosed in Japanese Unexamined Patent Application Publication No. Hei-11-167530 delays a reference signal when the number of concurrent changes greater than or equal to a reference value occurs and validates data after the transient data error state due to noise ends. The methods disclosed in Japanese Unexamined Patent Application Publication Nos. 2004-318450 and Hei-7-84985 suppresses noise due to a concurrent change by dividing the data into parts of a certain bit width. When the data is divided, a write control signal is output for each corresponding bit in order to indicate whether the bit is valid or invalid.

The circuit configurations disclosed in the above three patent documents, however, adopt a method of making a concurrent judgment when data is transferred to an external circuit. The address and the transfer length are reported to the external circuit simultaneously with the data transfer, and the processing takes time.

Since there are various types of external circuits, a signal control method applicable to those various types of external circuits has been desired.

SUMMARY OF THE INVENTION

According to an aspect of an embodiment, a signal control circuit for outputting data of a plurality of bits comprises a data generation block for generating the data of the plurality of bits, a data storage block for storing the data generated by the data generation block and outputting the data to an external circuit in response to a request for outputting the data; a data retention block for retaining data output in a preceding session; a data judgment block for judging the number of changed bits when the data is output from the data generation block, by comparing each bit of the data output in the preceding session and a corresponding bit of the data to be sent in a current session, and outputting position information indicating the position of each changed bit and count information indicating the number of changed bits with respect to the data to be sent in the current session, when the number of changed bits has reached a predetermined level; and an output control block for receiving the position information and the count information, keeping a time period for stabilizing the change in value of the bit corresponding to the position information when the data is output, and directing the data storage block to send the value of the bit corresponding to the position information to the external circuit after the kept period has passed.

To accomplish the above objects, there is also provided a signal control apparatus for inputting and outputting data of a plurality of bits inside the apparatus. This signal control apparatus includes a target circuit to which the data of the plurality of bits is input and a signal control circuit. The signal control circuit includes the following elements: a data generation block for generating the data, a data storage block for storing the data generated by the data generation block and outputting the data to the target circuit in response to a request for outputting the data; a data retention block for retaining data output in a preceding session; a data judgment block for judging the number of changed bits when the data is output from the data generation block, by comparing each bit of the data output in the preceding session and a corresponding bit of the data to be sent in a current session, and outputting position information indicating the position of each changed bit and count information indicating the number of changed bits with respect to the data to be sent in the current session, when the number of changed bits has reached a predetermined level; and an output control block for receiving the position information and the count information, keeping a time period for stabilizing the change in value of the bit corresponding to the position information when the data is output, and directing the data storage block to send the value of the bit corresponding to the position information to the target circuit after the kept period has passed.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be described below with reference to the drawings.

An overview of the present invention will be described first, and then, the embodiment will be described.

Figure 1:
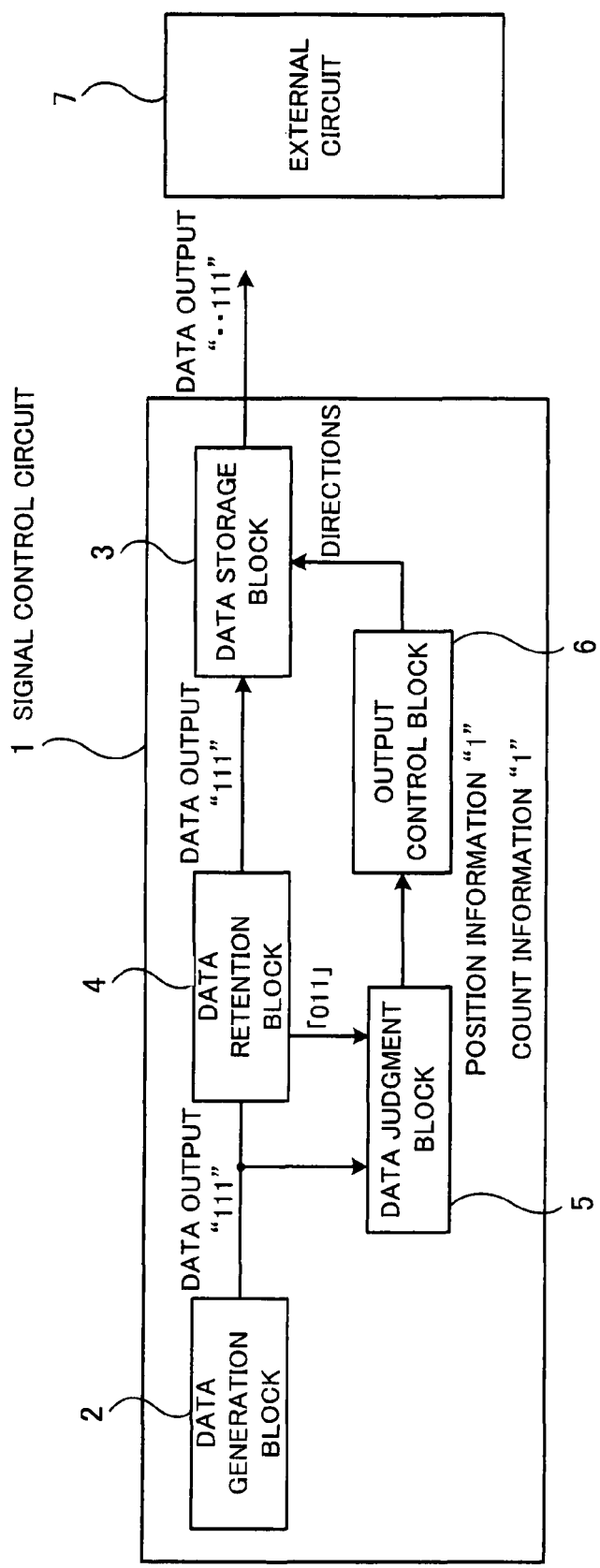
FIG. 1 is a view showing an overview of the present invention.

FIG. 1 is a view showing an overview of the present invention.

A signal control circuit 1 shown in FIG. 1 includes a data generation block 2, a data storage block 3, a data retention block 4, a data judgment block 5, and an output control block 6.

The data generation block 2 generates data of a plurality of bits ("111" in FIG. 1).

The data storage block 3 stores the data generated by the data generation block 2 and outputs the data to an external circuit 7 disposed outside the signal control circuit 1 in accordance with a request for outputting the data. The external circuit 7 is an external circuit viewed from the signal control circuit 1, and the signal control circuit 1 and the external circuit 7 may be formed integrally.

The data retention block 4 retains data output in a preceding session ("011" in FIG. 1).

When the data generation block 2 outputs the data to be sent, the data judgment block 5 judges the number of changed bits by comparing each bit of the data ("011") output in the preceding session and a corresponding bit of the data ("111") to be sent in the current session and outputs position information indicating the position of each changed bit and count information indicating the number of changed bits with respect to the data to be sent in the current session, when the number of changed bits has reached a predetermined level.

In the example shown in FIG. 1, when the predetermined level is set to "1", the position "1" of the bit counted from the beginning of the output is output as the position information, and the number of changed bits, which is "1", is output as the count information.

The output control block 6 receives the position information and the count information, keeps a time period for stabilizing the change in value of the bit corresponding to the position information when the data is output, and directs the data storage block 3 to send the value of the bit corresponding to the position information to the external circuit 7 after the kept period has passed. In the example shown in FIG. 1, a time period (indicated by "··" in the figure) for stabilizing the change in value "1" of the first bit of data "111" is kept, and the data storage block 3 is directed to send the value of the first bit to the external circuit 7 after the kept period has passed.

In the signal control circuit 1 described above, the data generation block 2 generates data of a plurality of bits. The data storage block 3 stores the data generated by the data generation block 2 and outputs the data to the external circuit 7 in accordance with a request for outputting the data. The data retention block 4 retains the data output in the preceding session. When the data generation block 2 outputs the data to be sent, the data judgment block 5 judges the number of changed bits by comparing each bit of the data output in the preceding session and the corresponding bit of the data to be sent in the current session and outputs position information and count information with respect to the data to be sent in the current session, when the number of changed bits has reached a predetermined level. The output control block 6 receives the position information and the count information, keeps a time period for stabilizing the change in value of the bit corresponding to the position information when the data is output, and directs the data storage block 3 to send the value of the bit corresponding to the position information to the external circuit 7 after the kept period has passed.

An embodiment of the present invention will next be described.

Figure 2:
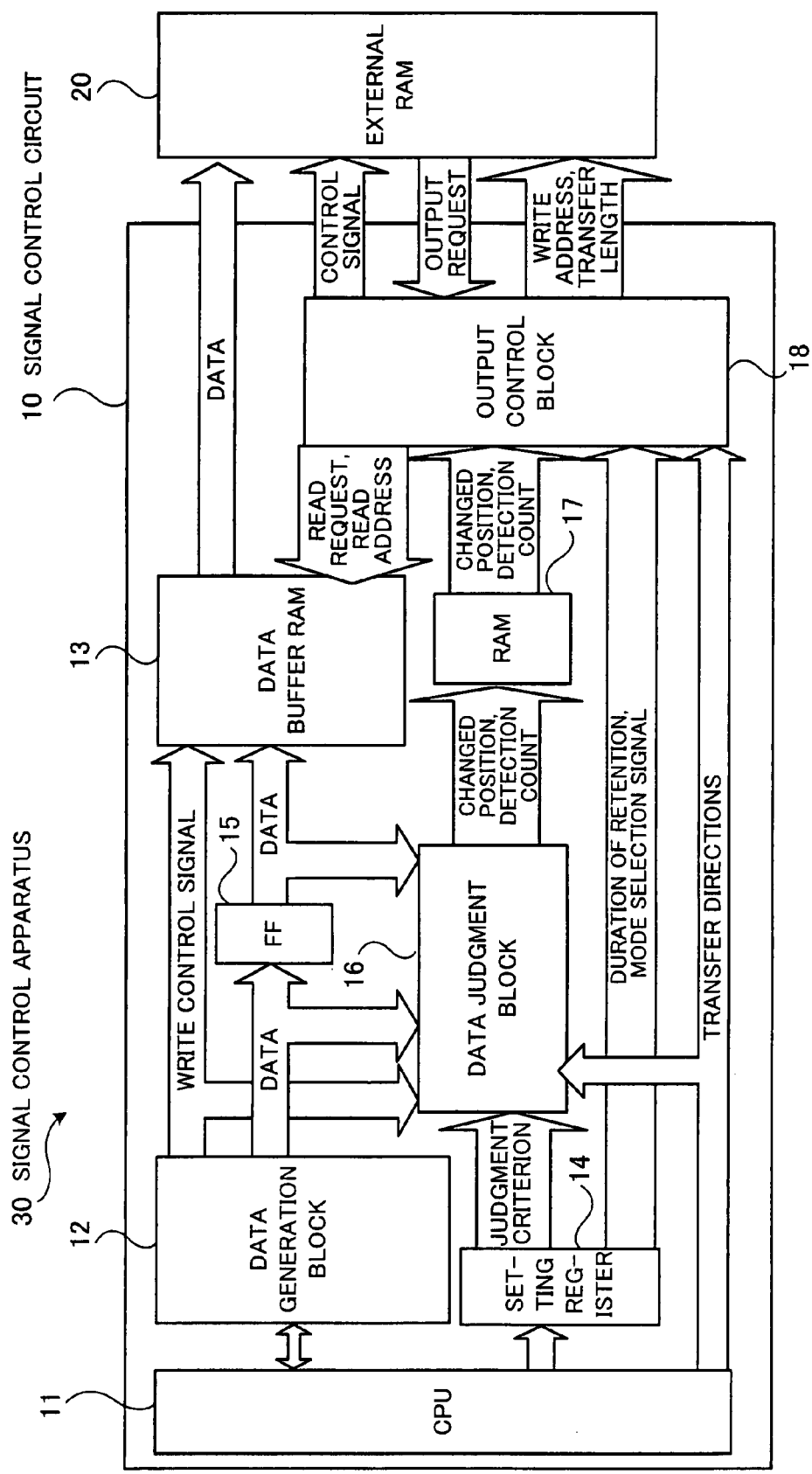
FIG. 2 is a view showing a signal control apparatus according to an embodiment of the present invention.

FIG. 2 is a view showing a signal control apparatus of the embodiment.

A signal control apparatus 30 includes a signal control circuit 10 and an external random access memory (RAM) 20 connected to the signal control circuit 10. The external RAM 20 is not limited to any specific type of RAM and can be a combination of a synchronous DRAM (SDRAM) and an SDRAM controller, for instance.

The signal control circuit 10 includes a central processing unit (CPU) 11, a data generation block 12, a data buffer RAM 13, a setting register 14, a flip-flop (FF) 15, a data judgment block 16, a RAM (setting information storage block) 17, and an output control block 18.

The CPU 11 controls the whole of the signal control circuit 10 and performs the following operations (1) to (3) mainly.
(1) Gives the data generation block 12 directions to generate data to be sent to the external RAM 20.
(2) Sends setting information, which will be described later, to the setting register 14.
(3) Sends directions to output data (transfer directions) to the data judgment block 16 and the output control block 18.

When the generation directions are received from the CPU 11, the data generation block 12 generates data of a plurality of bits to be output to the external RAM 20, and outputs a write control signal (write enable and write address) to the data buffer RAM 13 while outputting the generated data. In addition, the data generation block 12 outputs the data to the data buffer RAM 13 and the data judgment block 16 at the same time.

The data buffer RAM 13 is disposed between the data generation block 12 and the external RAM 20 and stores received data temporarily. When a read request and a read address are received, the data stored at the corresponding address is sent to the external RAM 20.

The setting register 14 stores setting information input from the CPU 11. The setting information contains the following three types of information.
(1) Value (judgment criterion) at which the data judgment block 16 judges that a concurrent change has occurred. For instance, the judgment may be made when 16 bits among data of 32 bits generated by the data generation block 12 have changed. The judgment criterion is appropriately determined by the CPU 11, for example, in association with the relationship between the clock speed of data output and the number of concurrently changed bits causing noise and the like in past equivalent circuits.
(2) Number of cycles extended (duration of retention) for the change in data in one session. The CPU 11 appropriately determines the duration of retention, for example, from the number of cycles in which the transient data error state caused by noise is presumed to end.

(3) Mode selection signal specifying a mode (retention mode) in which the data at the point of concurrent change is output longer by the cycles of a predetermined duration of retention or a mode (division mode) in which the data is divided at the point of concurrent change and output. The CPU 11 appropriately determines the mode selection signal, in other words, determines in advance the mode to be used in accordance with the type of the external RAM 20.

There are two retention modes: In a first retention mode (retention mode #1), a write control signal reporting whether the data is valid or not is output to the external RAM 20 when the data is sent from the data buffer RAM 13 to the external RAM 20; In a second retention mode (retention mode #2), the signal is not output.

The FF 15 has a function to hold the data output from the data generation block 12 temporarily.

When the write control signal output from the data generation block 12 is received, the data judgment block 16 reads the setting information from the setting register 14 and counts the number of locations where the input data have changed. To be more specific, each bit of the data received from the data generation block 12 (data output in the current session) is compared with the corresponding bit of the preceding data (data stored in the FF 15), in other words, a concurrent change is detected, and the position of each changed bit (changed position) and the number of changed bits (detection count) are detected. Then, it is determined in accordance with the judgment criterion whether the value of the bit at the changed position is retained longer by a predetermined number of cycles. To be more specific, it is determined whether the value is retained in more cycles when the number of detected concurrent changes has reached the judgment criterion.

If it is judged to retain the value in more cycles, the location of change is written in the RAM 17 as a changed position (such as, the fifth bit of 32 bits has changed). In addition, the total number of locations of change is written in the RAM 17 as a detection count.

The output control block 18 reads the changed position and the detection count from the RAM 17, calculates a data transfer length accordingly, and outputs the result and the write address to the external RAM 20 (transfer request). With these items, the external RAM 20 can easily find the amount of data to be written and the write position before the data is written.

Then, a control signal (request) indicating the beginning of data transmission is output to the external RAM 20.

The output control block 18 then outputs a data read request and a read address to the data buffer RAM 13, depending on the selected mode (retention mode or division mode) and the changed position read from the RAM 17.

An overview of the operation to detect a concurrent change (concurrent change detection operation) by the data judgment block 16 will next be described.

Figure 3:
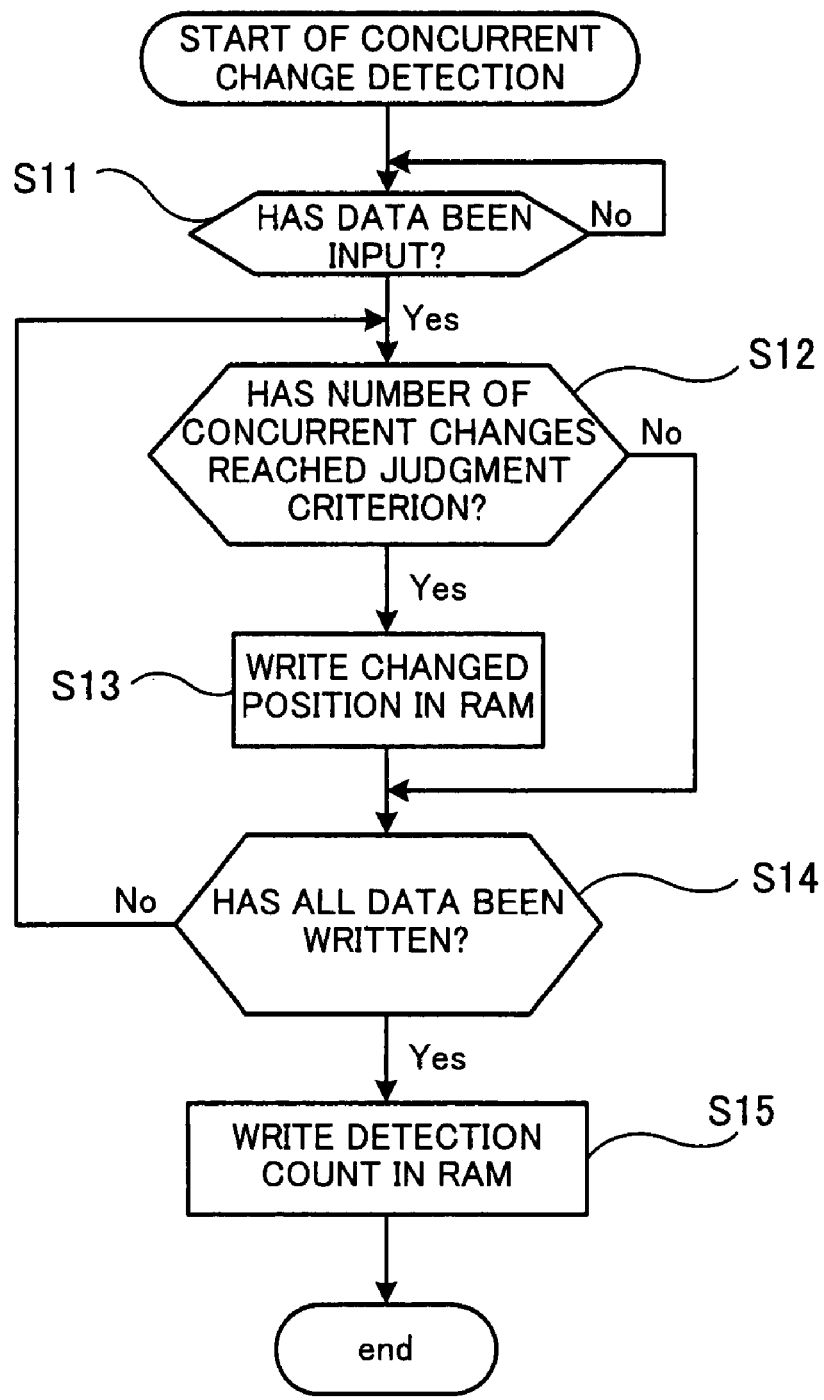
FIG. 3 is a flow chart showing a concurrent change detection operation.

FIG. 3 is a flow chart showing the concurrent change detection operation.

The data judgment block 16 checks the write control signal to see whether data has been input (whether data has been written into the data buffer RAM 13), in step S11.

If data has not been input (No in step S11), data input is waited for.

If data has been input (Yes in step S11), each bit is compared with a corresponding bit of the preceding data to see whether the number of concurrent changes has reached the judgment criterion, in step S12.

If the number of concurrent changes has not reached the judgment criterion (No in step S12), the processing goes to step S14.

If the number of concurrent changes has reached the judgment criterion (Yes in step S12), the changed position is written in the RAM 17 in step S13.

Then, the write control signal is checked to see whether data output by the data generation block 12 has ended (whether a data write to the data buffer RAM 13 has ended), in step S14.

If the data output has not ended (No in step S14), the processing goes to step S12 to continue the concurrent change detection operation.

If the data output has ended (Yes in step S14), the detection count is written in the RAM 17 in step S15.

Now, the concurrent change detection operation ends.

Functions of the data judgment block 16 will next be described in detail.

Figure 4:
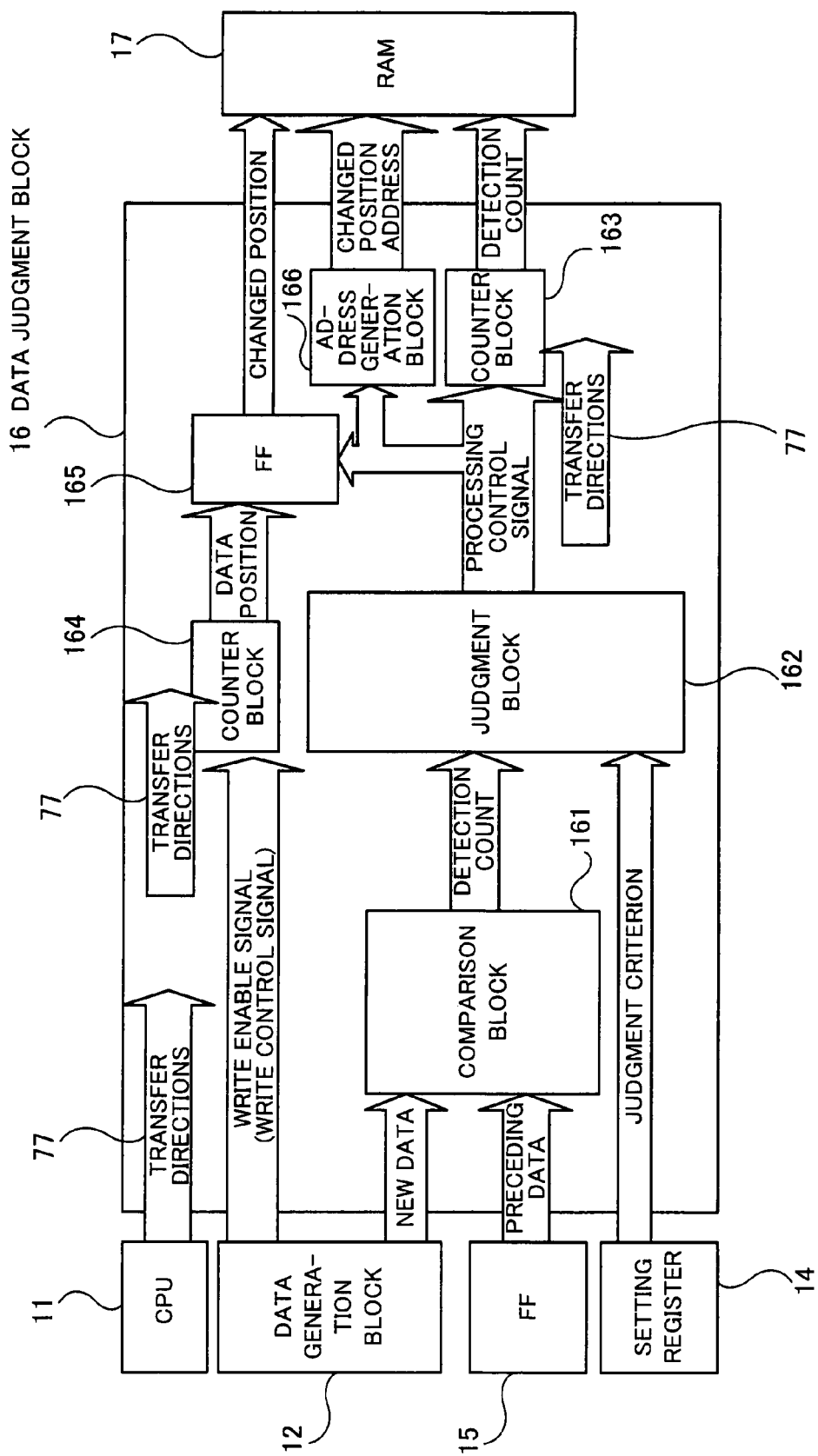
FIG. 4 is a block diagram showing functions of a data judgment block.

FIG. 4 is a block diagram showing the functions of the data judgment block 16.

The data judgment block 16 includes a comparison block 161, a judgment block 162, a counter block 163, another counter block 164, a flip-flop (FF) 165 with enable input, and an address generation block 166.

The comparison block 161 compares each bit of the received data (new data) and the corresponding bit of the preceding data and obtains a detection count.

The judgment block 162 reads the judgment criterion stored in the setting register 14 and, if the detection count is greater than or equal to the judgment criterion, sends a one-cycle processing control signal to the counter block 163.

The counter block 163 includes a counter for counting the detection count and counts the detection count each time the processing control signal is input.

The counter block 164 counts a write enable signal included in the write control signal output from the data generation block 12 when the data is stored in the data buffer RAM 13. The counted number equals the data location counted from the beginning of writing.

The flip-flop 165 with enable input handles a processing control signal from the judgment block 162 as an enable signal and, when the processing control signal is input, that is, when the detection count is greater than or equal to the judgment criterion, writes the value of the corresponding data position as a changed position in the RAM 17.

The address generation block 166 generates the address of the changed position (changed position address) each time the processing control signal is received and writes the address in the RAM 17. The changed position and its address information are stored in association with each other in the RAM 17.

In accordance with transfer directions 77 from the CPU 11, the detection count is written at a predetermined address in the RAM 17. Then, the counters of the counter block 163 and the counter block 164 are reset. Three transfer directions 77 in FIG. 4 are the same signals.

Functions of the output control block 18 will next be described in detail, but the functions of the output control block 18 depend on whether the retention mode or the division mode is selected. First, the functions of the output control block 18 in the retention mode will be described, and then the functions of the output control block 18 in the division mode will be described.

Figure 5:
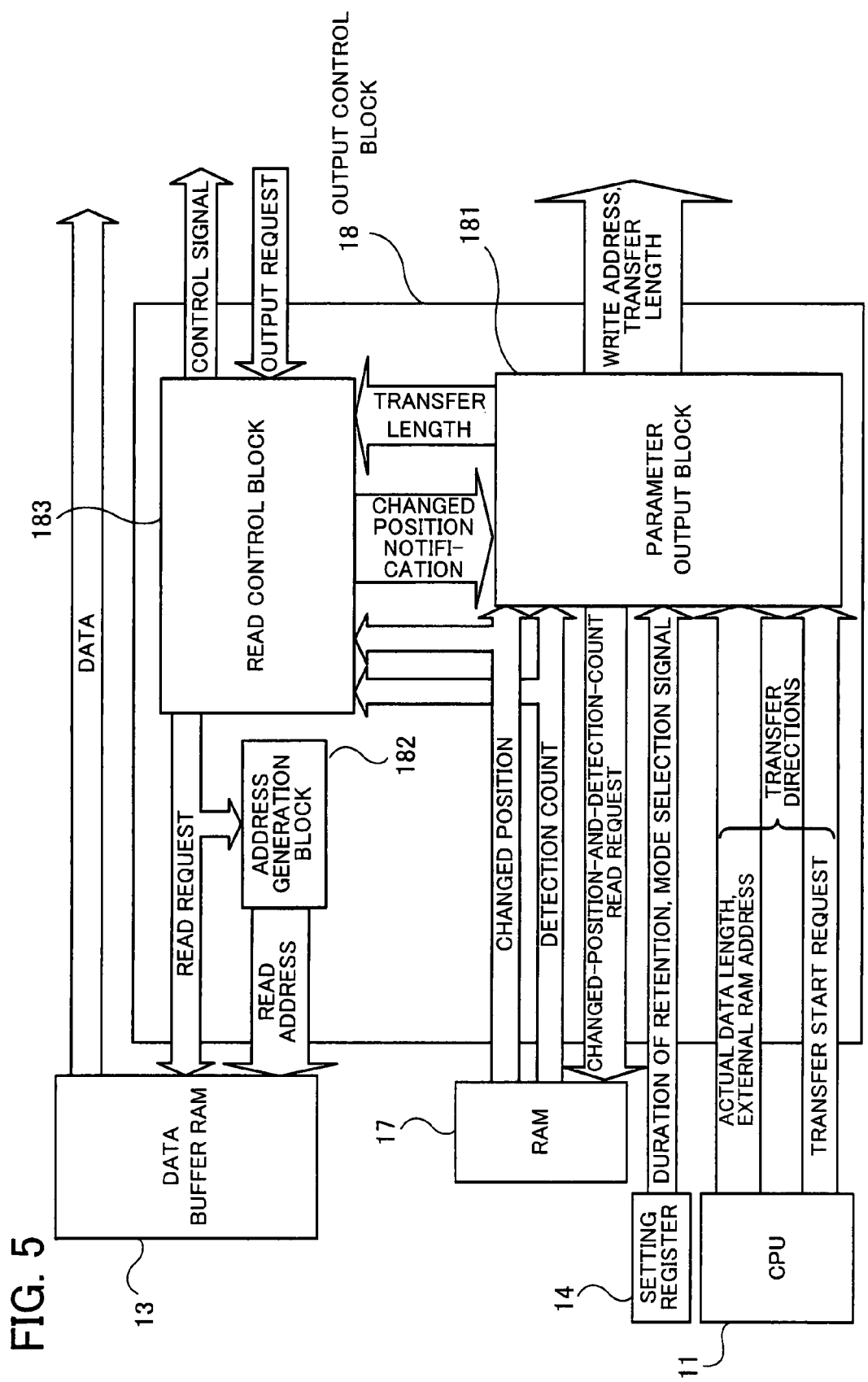
FIG. 5 is a block diagram showing functions of an output control block in a retention mode.

FIG. 5 is a block diagram showing the functions of the output control block 18 in the retention mode.

The output control block 18 includes a parameter output block 181, an address generation block 182, and a read control block 183.

As shown in FIG. 5, the transfer directions contain a transfer start request, an actual data length, and an external RAM address. The actual data length is information indicating the length (number of bits) of data output by the data generation block 12. The external RAM address is the starting address in the external RAM 20, from which the data is written.

When a transfer start request is input from the CPU 11, the parameter output block 181 holds the values of the actual data length, the external RAM address, the duration of retention, and the mode selection signal at that time.

Then, the parameter output block 181 outputs a changed-position-and-detection-count read request to the RAM 17, reads the detection count and the changed position, and calculates the transfer length from the actual data length. The calculated transfer length is sent to the read control block 183, and write addresses are generated by adding the address corresponding to the transfer length to the external RAM address and is sent to the external RAM 20 together with the transfer length.

The address generation block 182 contains a counter and generates a value by incrementing the counter while the read request is high. The generated value is sent as a read address to the data buffer RAM 13. While the read request is low, the counter is not incremented, and the value of the counter is sent as a read address to the data buffer RAM 13.

When an output request is received from the external RAM 20, the read control block 183 sends a read request to the data buffer RAM 13 and the address generation block 182. If the changed position is reached while the read request is being sent, a changed position notification is sent to the parameter output block 181.

Processing in Retention Mode #1

Processing (data output processing) of the output control block 18 in retention mode #1 will next be described.

Figure 6:
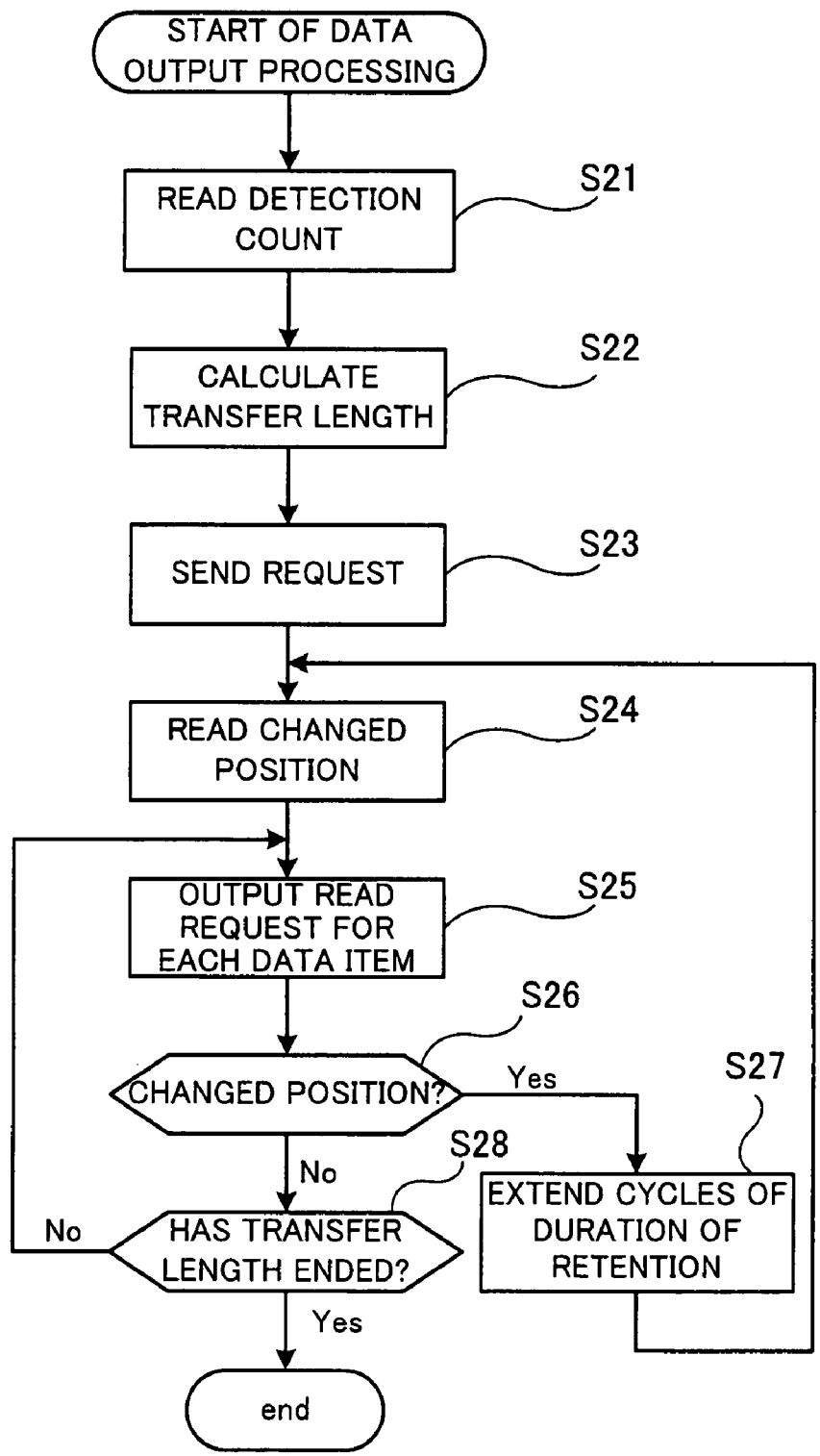
FIG. 6 is a flow chart showing processing in a first retention mode.

FIG. 6 is a flow chart showing processing in the first retention mode.

The parameter output block 181 reads the detection count from the RAM 17 in step S21.

The parameter output block 181 calculates a transfer length in step S22. The equation is:

(Transfer length)=(Data length)+(Detection count)×(Duration of retention).

The read control block 183 sends a request (control signal) to the external RAM 20 to start data output in step S23.

The read control block 183 reads a changed position from the RAM 17 in step S24.

The read control block 183 outputs a read request, and the address generation block 182 outputs a read address, causing the data buffer RAM 13 to output each bit of the data, in step S25.

When the read request is output, the read control block 183 judges in step S26 whether each bit of the data is in a changed position.

If the bit is in a changed position (Yes in step S26), the read control block 183 keeps the request data low in cycles corresponding to the duration of retention, so that the output period of the value of the bit corresponding to the changed position is extended, in step S27. That is, the value of the bit corresponding to the changed position is held in cycles of the duration of retention plus one. At that time, an attempt to write the control signal is disabled in the cycles of the duration of retention, including the changed position.

If the bit is not in a changed position (No in step S26), the read control block 183 checks in step S28 whether data output of the transfer length has ended (whether the transfer has ended).

If the data output has not ended (No in step S28), the processing goes to step S25, and the operation is repeated with the changed position changed to the next position. Through these steps, the processing to output the data of the detection count is performed.

When the data output ends (Yes in step S28), the data output processing ends.

Figure 7:
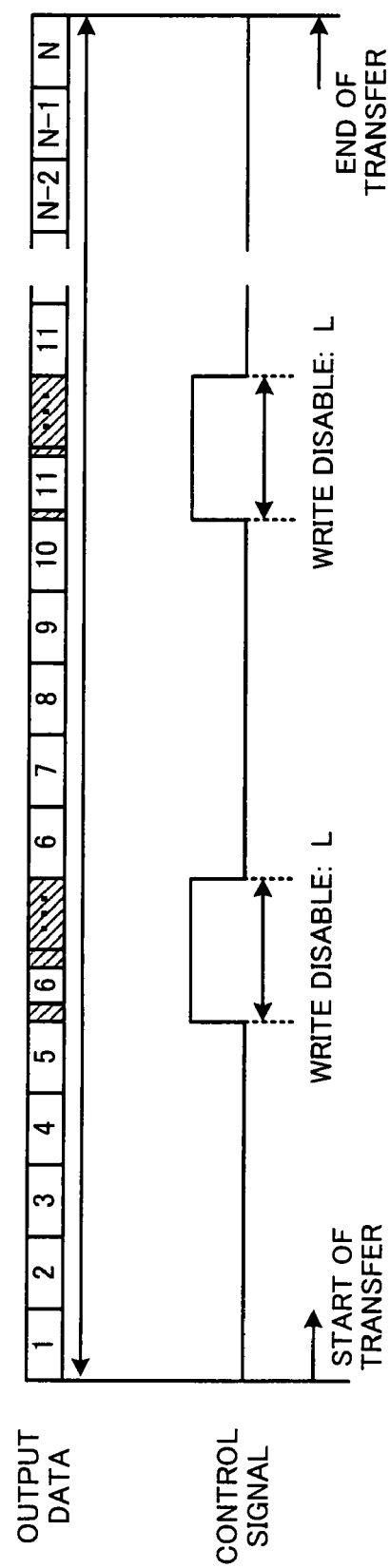
FIG. 7 is a view showing data output to an external RAM in the retention mode.

FIG. 7 is a view showing data output to the external RAM in the retention mode.

In FIG. 7, the transfer length is denoted by N, and the duration of retention is denoted by L.

Processing in Retention Mode #2

The processing of the output control block 18 in retention mode #2 is the same as that in retention mode #1 except that an attempt to write the control signal is not disabled in the cycles of the duration of retention, including the changed position, in step S27 in FIG. 6.

Example in the Retention Mode

The operation of the output control block 18 in retention mode #1 will be described, with an example in which the actual data length is "16", the duration of retention is "2", the detection count is "2", and the changed positions are "6" and "11".

Figure 8:
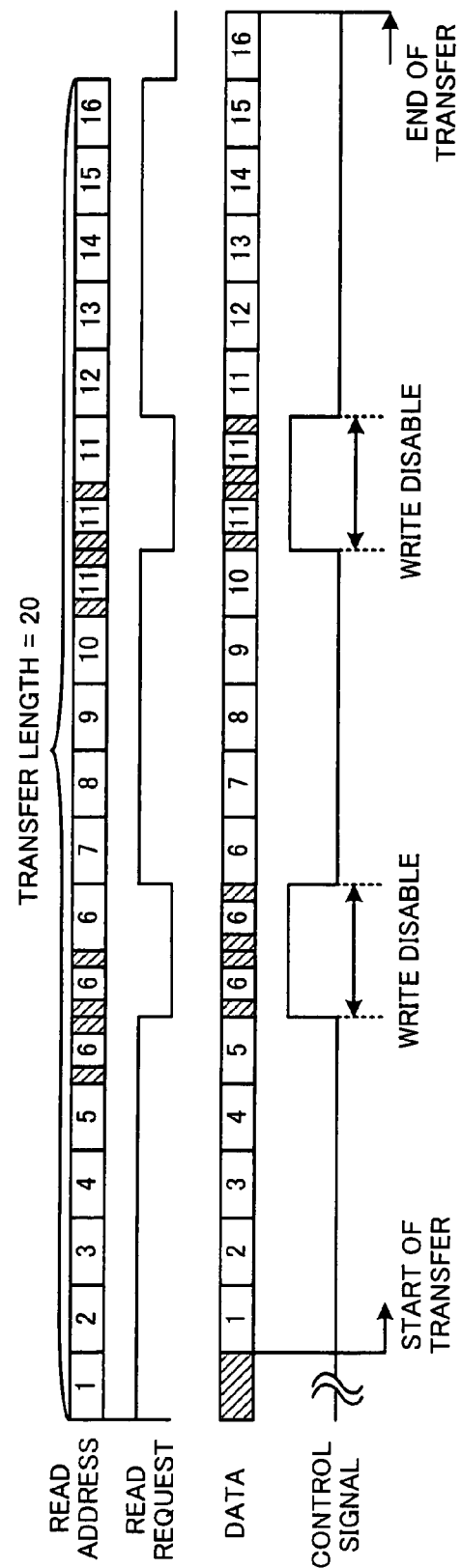
FIG. 8 is a view showing the relationship between read addresses and data to be output in an example.

FIG. 8 is a view showing the relationship between read addresses in the data buffer RAM 13 and the data to be output to the external RAM 20 in the example. The data shown in FIG. 8 is output from the data buffer RAM 13 to the external RAM 20. The address values assigned to the data shown in FIG. 8 are the read address values output from the address generation block 182 and are not the address values of the external RAM 20. The address value "1" in FIG. 8 is the address where the data value "1" is stored in the data buffer RAM 13.

The parameter output block 181 calculates a transfer length from the actual data length and the duration of retention and detection count read from the RAM 17. In the shown example, (Transfer length)=16+2×2=20.

The parameter output block 181 sends the transfer length and the write address as transfer parameters to the external RAM 20. Then, the parameter output block 180 sends the transfer length and the duration of retention to the read control block 183, and sends a read request to the RAM 17. Then, the RAM 17 sends the changed position "6" and the detection count to the parameter output block 181 and the read control block 183.

The read control block 183 sends a control signal (request) to the external RAM 20 and, when an output request is received, sends a read request (high) to the data buffer RAM 13 and the address generation block 182.

The address generation block 182 generates a read address and sends the address to the data buffer RAM 13.

The data buffer RAM 13 reads data at the address corresponding to the read address and outputs the data to the external RAM 20.

After the read request for changed position "6" is output, the read control block 183 brings the read request low. This causes the address generation block 182 to continue outputting the read address of the changed position, causing the data buffer RAM 13 to continue outputting the data of the changed position "6". Because the mode selection signal has selected retention mode #1 in this example, the control signal is kept high in the corresponding period, to disable the external RAM 20 from writing the data output from the data buffer RAM 13.

The read control block 183 brings the read request low and sends a changed position notification to the parameter output block 181 at the same time.

When the changed position notification is received, the parameter output block 181 sends a request for reading the next changed position to the RAM 17. Then, the RAM 17 outputs the next changed position "11".

After the duration of retention (2 cycles) has passed, the read control block 183 brings the read request high and the control signal low. So, the address generation block 182 generates a new read address, and the data of the new bit is output from the data buffer RAM 13.

When the data at the next changed position "11" is received, the read control block 183 carries out the same operation as described above. That is, after a request for reading the changed position "11" is output, the read request is brought low. Accordingly, the data buffer RAM 13 continues outputting the data at the changed position "11". The control signal is kept high in the corresponding period.

The read control block 183 brings the read request low and sends a changed position notification to the parameter output block 181 at the same time.

When a read request of transfer length "20" ends, the read control block 183 stops sending the read request. This terminates the data transfer to the external RAM 20.

As described above, the data is transferred from the data buffer RAM 13 to the external RAM 20 in accordance with the transfer length included in the transfer directions given to the external RAM 20, with each changed position calculated by the data judgment block 16 retained longer.

Division Mode

Figure 9:
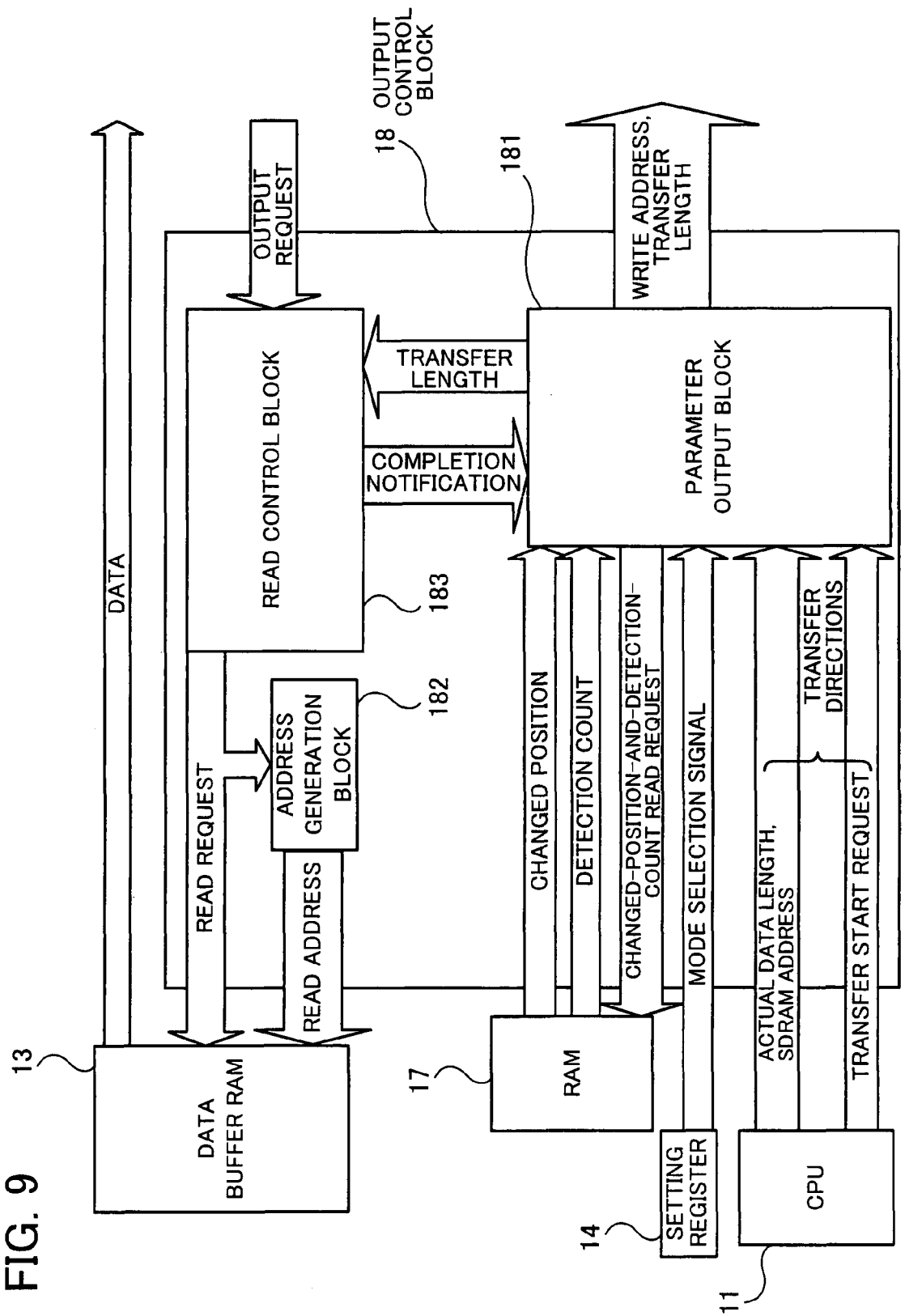
FIG. 9 is a block diagram showing functions of the output control block in a division mode.

FIG. 9 is a block diagram showing the functions of the output control block 18 in the division mode.

The division mode differs from the retention mode mainly in the setting of the mode selection signal and the operation of the parameter output block 181 and the read control block 183. A description of features in common with the retention mode will be omitted.

In the division mode, just the parameter output block 181 in the output control block 18 receives the changed position and the detection count from the RAM 17 (the read control block 183 does not receive them).

On a transfer start request from the CPU 11, the parameter output block 181 receives and retains the values of the actual data length, the address in the external RAM 20, and the mode selection signal at that time (the duration of retention is not used).

The parameter output block 181 reads the detection count and the changed position from the RAM 17 and calculates a transfer length in the division mode accordingly.

The read control block 183 does not send a control signal to disable the external RAM 20 from writing the data output from the data buffer RAM 13 during the data transfer. However, a request is sent.

Processing in the Division Mode

Processing (data output processing) of the output control block 18 in the division mode will next be described.

Figure 10:
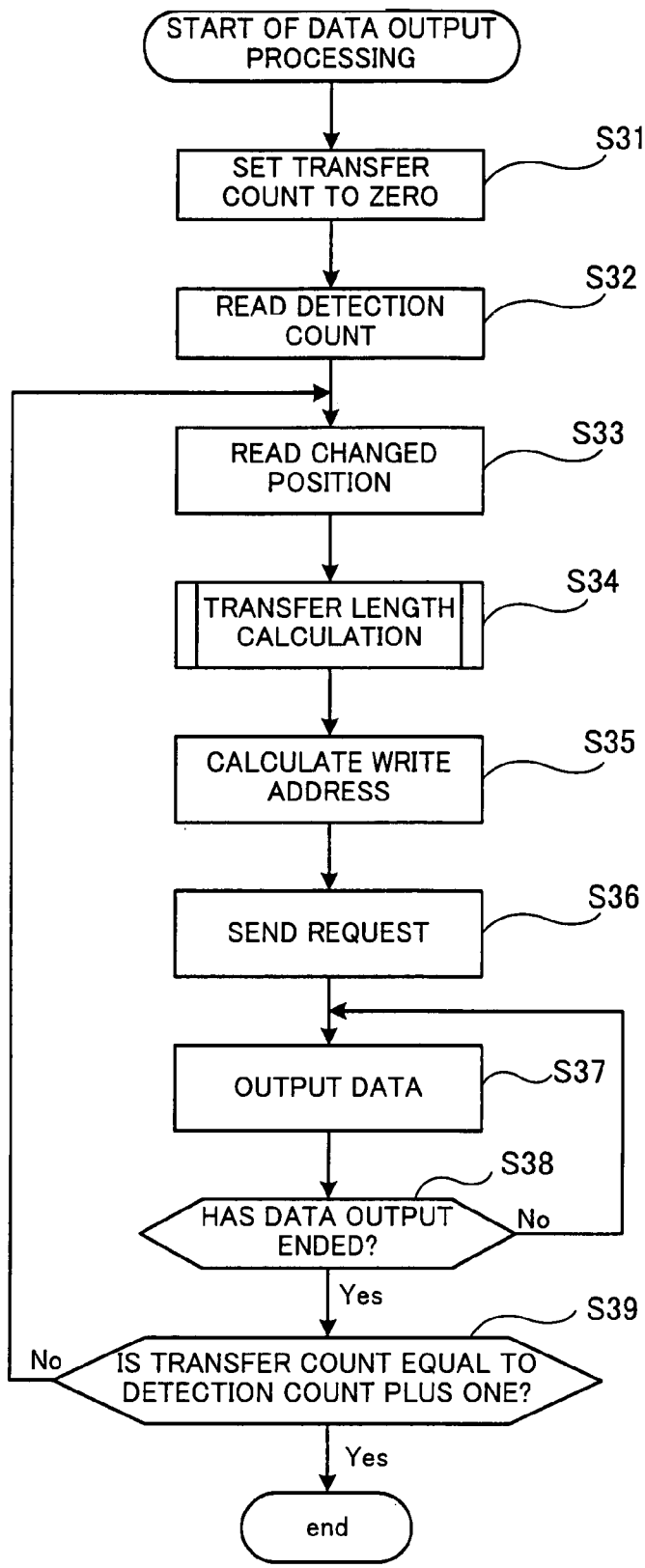
FIG. 10 is a flow chart showing processing in the division mode.

FIG. 10 is a flow chart showing the processing in the division mode.

The transfer count is set to "0" in step S31. The detection count is a parameter held by the output control block 18.

A detection count is read from the RAM 17 in step S32.

A changed position is read from the RAM 17 in step S33.

A transfer length is calculated from the changed position in step S34. The calculation method will be described later.

A write address in the external RAM 20 is calculated in step S35. The write address in the external RAM 20 is obtained from the preceding address and the preceding transfer length.

A request is sent to the external RAM 20 in step S36. The data output is started, and the data of the transfer length is output in step S37. Each time one bit of the data is output, it is checked whether the data output has ended (whether the data of the transfer length has been output) in step S38.

If the data output has not ended (No in step S38), the processing goes to step S37, and the data of the next bit is output.

If the data output has ended (Yes in step S38), it is checked whether the transfer count equals the detection count plus one, in step S39.

If the transfer count does not equal the detection count plus one (No in step S39), the processing goes to step S33, and the processes of step S33 and after are performed.

If the transfer count equals the detection count plus one (Yes in step S39), the data output processing ends. That is, the data transfer session is repeated by the number of times obtained by adding one to the detection count, in the division mode.

The transfer length calculation processing in step S34 mentioned above will next be described.

Figure 11:
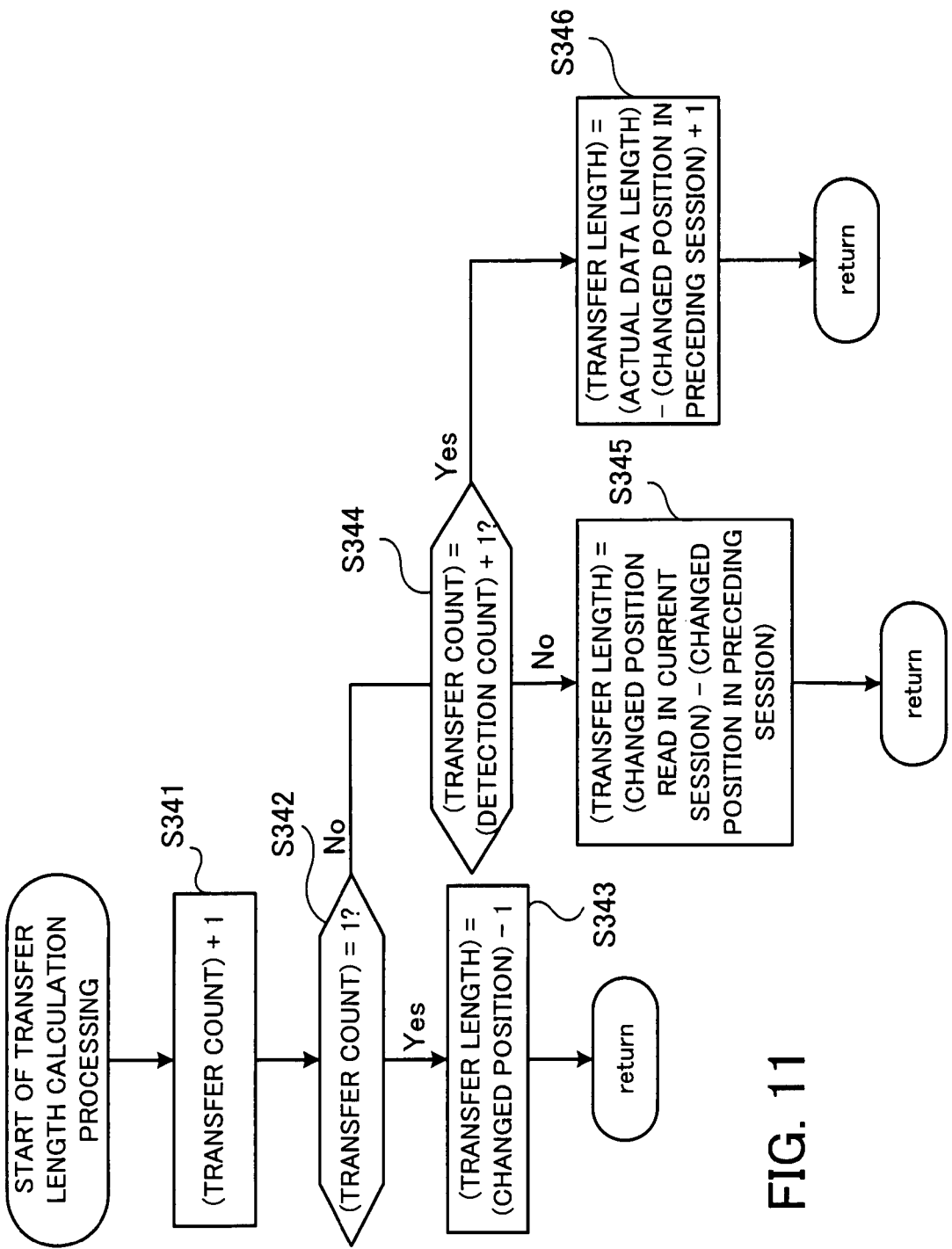
FIG. 11 is a flow chart showing processing to calculate a transfer length.

FIG. 11 is a flow chart showing the transfer length calculation processing.

The transfer count is incremented by one in step S341.

It is checked whether the transfer count is "1" in step S342.

If the transfer count is 1 (Yes in step S342), the current transfer session is the first one, so that the transfer length is set, in step S343, as follows:

(Transfer length)=(Changed position)−1.

If the transfer count is not 1 (No in step S342), the current transfer session is judged to be a second or subsequent one. It is checked in step S344 whether:

(Transfer count)=(Detection count)+1.

If the transfer count does not equal the detection count plus one (No in step S344), the current transfer session is not the last one. Therefore, the transfer length is set, in step S345, as follows:

(Transfer length)=(Changed position read in the current session)−(Preceding changed position).

If the transfer count equals the detection count plus one (Yes in step S344), the current transfer session is the last one. Therefore, the transfer length is set, in step S346, as follows:

(Transfer length)=(Actual data length)−(Preceding changed position)+1.

Figure 12:
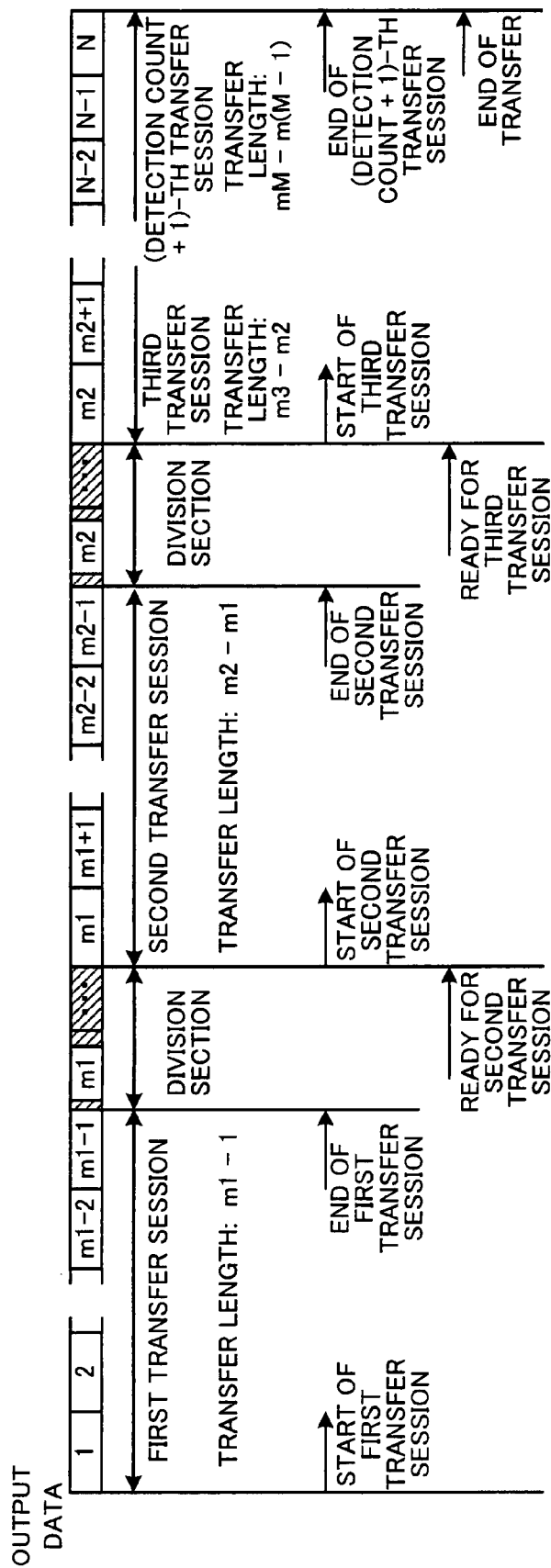
FIG. 12 is a view showing data output to the external RAM in the division mode.

FIG. 12 is a view showing data output to the external RAM 20 in the division mode.

In the example shown in FIG. 12, the transfer length is N, the detection count is M; m1, m2, to mM represent the first, second, to M-th changed positions respectively; and shaded parts represent division sections.

Example in the Division Mode

The operation of the output control block 18 in the division mode will be described, with an example in which the actual data length is "16", the detection count is "2", and the changed positions are "6" and "11".

Figure 13:
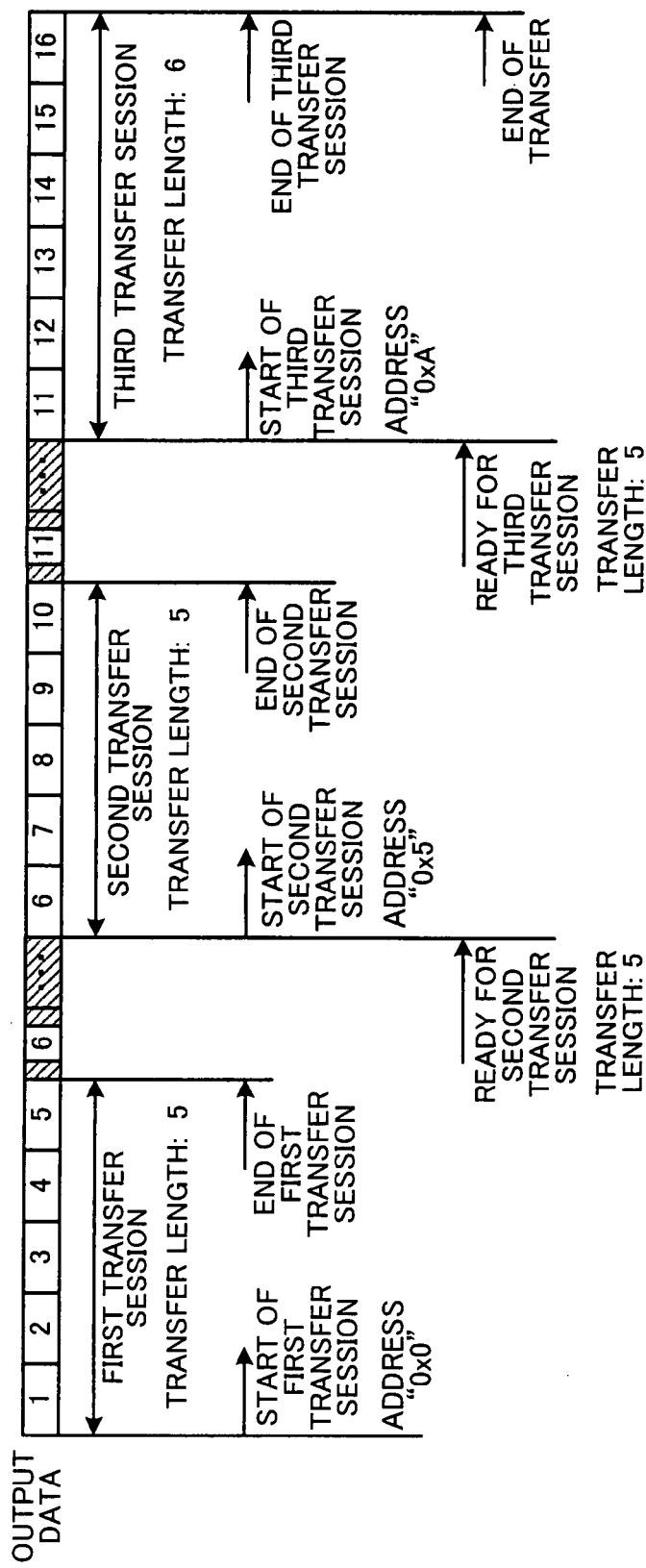
FIG. 13 is a view showing data output to the external RAM in the division mode in an example.

FIG. 13 is a view showing data output from the data buffer RAM 13 in the example in the division mode. The value assigned to each bit of the output data shown in FIG. 13 is the value of the read address generated by the address generation block 182.

The parameter output block 181 calculates the transfer length from the read changed position. Because the transfer length in the first session is set to the changed position minus one, as described earlier, the first transfer length in this example is:

(First transfer length)=6−1=5.

The parameter output block 181 outputs a transfer request to the external RAM 20, using the transfer length and the address as transfer parameters. The write address is "0×0" here.

The parameter output block 181 sends the transfer length to the read control block 183.

When an output request is received from the external RAM 20, the read control block 183 starts the transfer (first transfer session). A read request is sent to the data buffer RAM 13 and the address generation block 182 during the period corresponding to the transfer length (=5 cycles).

The address generation block 182 generates read addresses "0×0" to "0×5" in accordance with the output read request.

After the read request of the transfer length (=5) ends, the read control block 183 brings the read request low and sends a completion notification to the parameter output block 181. Now, the first transfer session ends.

The parameter output block 181 finds that the transfer count (=2) is smaller than the detection count plus one (=3), and performs a second transfer session. Because the current changed position is "11" and the preceding changed position is "6", the transfer length of the transfer session is:

(Transfer length)=11−6=5.

The write address is obtained from the preceding write address and the preceding transfer length. In this example, the bit width of the external RAM 20 is supposed to be the same as the bit width of the output data, and the address is obtained by adding the preceding transfer length to the preceding write address. Therefore, the write address is:

(Write address)=0×0+0×5=0×5.

A transfer request is output with the transfer length and the write address used as transfer parameters. The subsequent processing is the same as that in the first session.

After the read request of the transfer length (=5) ends, the read control block 183 brings the read request low and sends a completion notification to the parameter output block 181. Now, the second transfer session ends.

The parameter output block 181 finds that the transfer count (=3) equals the detection count plus one (=3), and performs a third transfer session.

The third transfer session becomes the last one, and the transfer length is:

(Transfer length)=16−11+1=6.

The write address is:

(Write address)=0×5+0×5=0×A.

The subsequent processing is the same as that in the first or second session.

As has been described above, in the signal control apparatus 30, when the data generated by the data generation block 12 is stored in the data buffer RAM 13 temporarily, the data judgment block 16 judges in advance whether the processing for any concurrent change is to be performed. When the data is output to the external RAM 20, the output control block 18 instructs the data buffer RAM 13 to output the data in the retention mode or division mode, depending on the judgment result. Accordingly, the processing time can be reduced in comparison with a case in which the judgment is made when the data is output from the data buffer RAM 13, for instance.

In addition, even if the data output from the data generation block 12 change due to external noise or the like, the correct data can be sent to the external RAM 20 with reliability.

If the external RAM 20 supports just a valid-invalid control signal for a set of all bits, retention mode #1 can be used.

If data validity is required alone, as in a function test or the like, the processing time can be reduced by simplifying the control operation through the use of retention mode #2.

The processing time can be reduced further by starting the control operation in retention mode #1 and switching to retention mode #2 after the reliability is ensured.

Retention mode #2 can be used even if the external RAM 20 does not support the valid-invalid processing signal. In that case, the expected value is held to "X" (don't care) for the duration of retention L.

Figure 14:
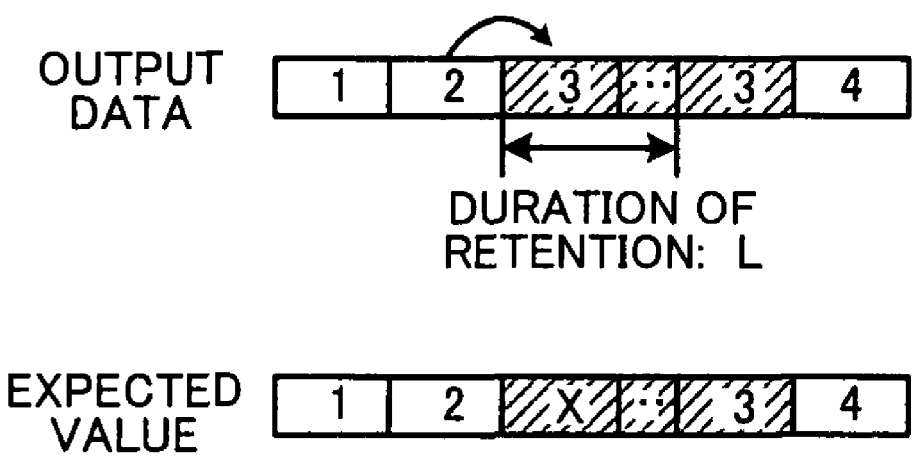
FIG. 14 is a view showing a second retention mode.

FIG. 14 is a view showing the second retention mode.

In the example shown in FIG. 14, correct data can be obtained by preventing the external RAM 20 from reading the output data as normal data during the duration of retention L.

It is preferable to use retention mode #2 if a memory controller is connected between the signal control circuit 10 and the external RAM 20. In that case, the memory controller should set the expected value to "X" (don't care) for the duration of retention L with respect to the expected value of the output data to the external RAM 20.

The division mode can be used also for the external RAM 20 (external circuit) which does not support the data valid-invalid processing. The division mode can also be used if a memory controller is used between the signal control circuit 10 and the external RAM 20. One reason is that the data output to the external RAM 20 is divided finally.

A mode causing a smaller delay (either retention mode #1 or retention mode #2 or either the retention mode or the division mode) may be selected by the CPU 11.

According to the present invention, the output control block receives the position information and count information generated in advance, keeps a time period needed to stabilize a change in value of the bit corresponding to the position information in the data output, and directs the data storage block to output the value of the bit corresponding to the position information to the external circuit after the kept period has passed, so that the processing time can be reduced in comparison with a case in which the position information and the count information are calculated when the data is output.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A signal control circuit for outputting data of a plurality of bits, comprising:
   a data generation block to generate the data of the plurality of bits;
   a data storage block to store the data generated by the data generation block and output the data to an external circuit in response to a request for outputting the data;
   a data retention block to retain data output in a preceding session;
   a data judgment block to judge the number of changed bits when the data is output from the data generation block, by comparing each bit of the data output in the preceding session and a corresponding bit of the data to be sent in a current session, and output position information indicating the position of each changed bit and count information indicating the number of changed bits with respect to the data to be sent in the current session when the number of changed bits has reached a predetermined level; and an output control block to receive the position information and the count information, keep a time period for stabilizing the change in value of said each changed bit indicated by the position information when the data is output, and direct the data storage block to send the value of said each changed bit indicated by the position information to the external circuit after the kept period has passed.

2. The signal control circuit according to claim 1, wherein the data judgment block judges the number of changed bits when the data is output from the data generation block and stored in the data storage block.

3. The signal control circuit according to claim 1, wherein the output control block outputs a transfer length in which the time period kept for stabilizing the change in value of the bit corresponding to the position information is taken into account, to the external circuit before giving directions to the data storage block.

4. The signal control circuit according to claim 1, wherein the output control block receives the position information and the count information and directs the data storage block to divide the data on the border between the bit indicated by the position information and the following bit and to send the divided data to the external circuit.

5. The signal control circuit according to claim 1, wherein the output control block receives the position information and the count information and directs the data storage block to keep sending the same value as the value of the bit corresponding to the position information to the external circuit for a predetermined period.

6. The signal control circuit according to claim 5, wherein, when the external circuit can judge whether the data is valid or invalid, the output control block sends a signal to disable the external circuit from writing the data during the time period kept for stabilizing the change in value of the bit corresponding to the position information.

7. The signal control circuit according to claim 5, further comprising a retention duration storage block to store the predetermined period.

8. A signal control apparatus for inputting and outputting data of a plurality of bits inside the apparatus, comprising:
a target circuit to which the data of the plurality of bits is input; and
a signal control circuit comprising:
a data generation block to generate the data;
a data storage block to store the data generated by the data generation block and output the data to the target circuit in response to a request for outputting the data;
a data retention block to retain data output in a preceding session;
a data judgment block to judge the number of changed bits when the data is output from the data generation block, by comparing each bit of the data output in the preceding session and a corresponding bit of the data to be sent in a current session, and output position information indicating the position of each changed bit and count information indicating the number of changed bits with respect to the data to be sent in the current session when the number of changed bits has reached a predetermined level; and
an output control block to receive the position information and the count information, keep a time period for stabilizing the change in value of said each changed bit indicated by the position information when the data is output, and direct the data storage block to send the value of said each changed bit indicated by the position information to the target circuit after the kept period has passed.

* * * * *